United States Patent
Suchta et al.

(10) Patent No.: US 9,193,241 B2
(45) Date of Patent: Nov. 24, 2015

(54) SYSTEMS AND METHODS FOR DAMPER HAVING JOUNCE SHOCK

(71) Applicants: GM GLOBAL TECHNOLOGY OPERATIONS LLC, Detroit, MI (US); THYSSENKRUPP BILSTEIN OF AMERICA, INC., Hamilton, OH (US)

(72) Inventors: Wojciech E. Suchta, Richmond Hill (CA); Donald G. Wirkner, Dexter, MI (US); Andrew Roby, Middletown, OH (US); Dennis Baker, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/153,719

(22) Filed: Jan. 13, 2014

(65) Prior Publication Data

US 2014/0239567 A1    Aug. 28, 2014

Related U.S. Application Data

(60) Provisional application No. 61/770,826, filed on Feb. 28, 2013.

(51) Int. Cl.
*B60G 13/00* (2006.01)
*B60G 15/06* (2006.01)
(Continued)

(52) U.S. Cl.
CPC ............. *B60G 15/061* (2013.01); *B60G 15/06* (2013.01); *B60G 15/067* (2013.01); *F16F 1/00* (2013.01);
(Continued)

(58) Field of Classification Search
CPC .... B60G 15/06; B60G 15/061; B60G 15/067; B60G 2204/1241; B60G 2204/128; B60G 2204/129; F16F 7/00; F16F 7/09; F16F 9/00; F16F 9/062; F16F 9/067; F16F 9/16; F16F 9/3207; F16F 9/3214; F16F 9/3221; F16F 9/346; F16F 9/36
See application file for complete search history.

(56) References Cited

U.S. PATENT DOCUMENTS 1,118,818 A * 11/1914 Sherman ................... 267/225
1,542,511 A *  6/1925 Lancia ................. 280/124.127

(Continued)

FOREIGN PATENT DOCUMENTS

| DE | 10222940 C1 | 7/2003 |
|---|---|---|
| DE | 10236591 A1 | 2/2004 |

(Continued)

OTHER PUBLICATIONS

Patil, R., U.S. Appl. No. 14/098,748, filed Dec. 6, 2013.
(Continued)

*Primary Examiner* — Melody Burch
(74) *Attorney, Agent, or Firm* — Ingrassia Fisher & Lorenz, P.C.

(57) ABSTRACT

Methods and apparatus are provided for a damper having a jounce shock. The damper includes a top mounting portion adapted to couple the damper to a vehicular frame and a bottom mounting portion adapted to couple the damper to a vehicular suspension system. The damper further includes a damper tube assembly disposed between the top mounting portion and the bottom mounting portion. The damper tube assembly includes a jounce shock system and a rod having a first piston and a second piston. The rod is movable within the damper tube assembly from a first position to a second position, and the second piston engages the jounce shock system as the rod approaches the second position.

16 Claims, 9 Drawing Sheets

(51) Int. Cl.
  *F16F 1/00* (2006.01)
  *F16F 9/00* (2006.01)
  *F16F 9/06* (2006.01)
  *F16F 9/32* (2006.01)
  *F16F 7/09* (2006.01)

(52) U.S. Cl.
  CPC ..... *B60G 2204/128* (2013.01); *B60G 2204/129* (2013.01); *B60G 2204/1242* (2013.01); *F16F 7/09* (2013.01); *F16F 9/067* (2013.01); *F16F 9/3207* (2013.01)

(56) References Cited

U.S. PATENT DOCUMENTS

| | | | |
|---|---|---|---|
| 2,145,891 A * | 2/1939 | Rice, Jr. | 267/34 |
| 2,917,303 A * | 12/1959 | Vierling | 267/225 |
| 3,111,201 A | 11/1963 | Bliven et al. | |
| 3,582,058 A * | 6/1971 | Hodges | 267/34 |
| 5,308,104 A | 5/1994 | Charles | |
| 5,467,970 A | 11/1995 | Ratu et al. | |
| 5,913,391 A * | 6/1999 | Jeffries et al. | 188/317 |
| 6,234,461 B1 | 5/2001 | Bohm et al. | |
| 8,123,203 B2 | 2/2012 | Patil et al. | |
| 8,418,821 B2 | 4/2013 | Henneberg et al. | |
| 2003/0209395 A1 | 11/2003 | Fukaya | |
| 2004/0178552 A1 | 9/2004 | Schudt et al. | |
| 2005/0012256 A1 | 1/2005 | Huprikar et al. | |
| 2006/0043659 A1 | 3/2006 | Gofron et al. | |
| 2006/0131119 A1 | 6/2006 | Ishikawa | |
| 2007/0119671 A1 | 5/2007 | Quinn et al. | |
| 2008/0179148 A1 | 7/2008 | Quinn et al. | |
| 2009/0145707 A1 | 6/2009 | Henneberg et al. | |
| 2010/0230877 A1 | 9/2010 | Schudt et al. | |
| 2013/0234377 A1 * | 9/2013 | Leonard | 267/219 |
| 2013/0307204 A1 | 11/2013 | Patil et al. | |
| 2013/0328255 A1 | 12/2013 | Gelder et al. | |
| 2014/0175722 A1 | 6/2014 | Baek | |
| 2014/0252707 A1 | 9/2014 | Fleniken et al. | |
| 2015/0008627 A1 * | 1/2015 | Leonard | 267/64.24 |
| 2015/0076784 A1 | 3/2015 | Al-Dahhan | |

FOREIGN PATENT DOCUMENTS

| | | |
|---|---|---|
| DE | 10351840 A1 | 6/2004 |
| WO | WO-03008215 A1 * | 1/2003 |

OTHER PUBLICATIONS

USPTO, Office Action for U.S. Appl. No. 14/098,748, mailed May 5, 2015.
USPTO, Notice of Allowance and Fee(s) Due for U.S. Appl. No. 14/098,748 mailed Jul. 22, 2015.

* cited by examiner

SYSTEMS AND METHODS FOR DAMPER HAVING JOUNCE SHOCK

CROSS-REFERENCE TO RELATED APPLICATIONS

This application claims the benefit of U.S. Provisional Application No. 61/770,826, filed on Feb. 28, 2013. The disclosure of the above application is incorporated herein by reference.

TECHNICAL FIELD

The present disclosure generally relates to suspension systems for a vehicle and more particularly relates to systems and methods for a damper having a jounce shock for use with a vehicle.

BACKGROUND

Vehicles are typically equipped with suspension systems that include components that contract and expand to provide flexible relative movement between the body and chassis. During normal driving conditions, these components gradually dissipate the forces generated by bumps, potholes, and other road surface anomalies in a controlled manner that helps the driver to maintain control over the vehicle and provides passengers a comfortable driving environment.

In certain instances, the vehicle may encounter a road surface anomaly that causes the components of the suspension to contract beyond the designed operating range of springs and shocks/struts. Thus, many suspension systems employ impact load management systems that limit jounce. Such systems typically include jounce bumper assemblies configured to engage during severe impact events and provide a "bottoming" or a limit to further contractive motion. These assemblies may be used to limit jounce between, for example, sprung and unsprung vehicle masses and may be conveniently located within the body of a shock or strut. Such integrated assemblies typically include a rigid metallic striker plate coupled to the end cap of the damper tube and a jounce bumper coupled to the upper mount. Each is aligned along a common piston rod and spaced apart so that, during an impact event, the striker cap and jounce bumper engage causing the bumper to deform axially along the piston rod in the direction of loading. However, such a configuration provides little cushioning effect from impact loads because of the rigidity of the striker plate and the marginal capacity of the bumper to absorb associated energy. Accordingly, these and other similarly affected elements including the chassis frame and vehicle body structure are generally designed with a more rugged construction of greater mass and volume than would otherwise be required if the suspension system components were more energy absorbing.

Accordingly, it is desirable to provide systems and methods for a damper having a jounce shock for managing impact load in a vehicular suspension system that enables the use of lighter weight supporting materials without adversely impacting other desirable vehicle characteristics such as driving comfort or vehicle controllability. Furthermore, other desirable features and characteristics of the present invention will become apparent from the subsequent detailed description and the appended claims, taken in conjunction with the accompanying drawings and the foregoing technical field and background.

SUMMARY

In one embodiment, a damper is provided. The damper includes a top mounting portion adapted to couple the damper to a vehicular frame and a bottom mounting portion adapted to couple the damper to a vehicular suspension system. The damper further includes a damper tube assembly disposed between the top mounting portion and the bottom mounting portion. The damper tube assembly includes a jounce shock system and a rod having a first piston and a second piston. The rod is movable within the damper tube assembly from a first position to a second position, and the second piston engages the jounce shock system as the rod approaches the second position.

In another embodiment, a vehicle is provided. The vehicle includes a frame and a suspension system having a damper. The damper includes a top mounting portion coupled the frame and a bottom mounting portion coupled to the suspension system. The damper includes a jounce bumper assembly including a jounce bumper coupled to the top mounting portion. The jounce bumper defines a bore. The damper includes a rod coupled to the top mounting portion at a first rod end that passes through the bore of the jounce bumper. The rod also includes a first piston spaced apart from a second piston at a second rod end. The damper includes a tubular housing disposed between the top mounting portion and coupled to the bottom mounting portion. The rod is movable within the tubular housing from a first position to a second position. The damper further includes a jounce shock system disposed within the tubular housing. The jounce shock system includes a flask defining a passageway. The second piston enters the passageway of the flask when the rod approaches the second position.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. In addition, the same reference numerals may be used to denote the same or similar components.

Figure 1:
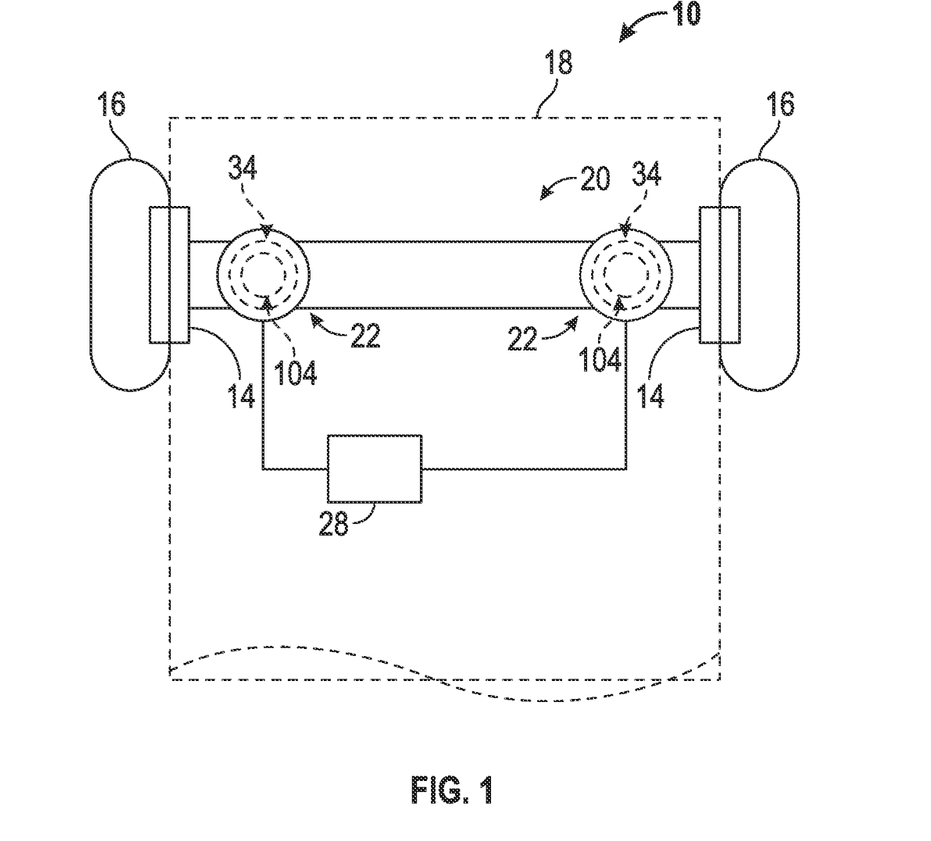
FIG. 1 is a functional block diagram illustrating a vehicle that includes a damper having a jounce shock in accordance with various embodiments.

With reference to FIG. 1, a vehicle 10 is shown including a damper with a jounce shock in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

The vehicle 10 is shown to include wheels 14, each fitted with a tire 16. The wheels 14 are supported by a vehicle frame 18 via a suspension system shown generally at 20. The suspension system 20 generally includes dampers 22. Although the suspension system 20 is shown to be associated with only two wheels 14 for ease of description (e.g., either front wheels or rear wheels), it is appreciated that the suspension system 20 of the present disclosure is also applicable to a single wheel 14, any pair of wheels 14 or all of the wheels 14 (plus others not shown) of the vehicle 10. As will be discussed in greater detail herein, the dampers 22 can include a jounce bumper assembly 34 and a jounce shock system 104, which can provide energy dissipation and reduction in peak forces experienced by the vehicle frame 18 during an impact event.

In one example, the vehicle 10 can also include a control module 28, which can be in communication with a portion of the suspension system 20 to control the activation of a portion of the suspension system 20. For example, the control module 28 can be in communication with one or more of the dampers 22 to activate the dampers 22 in response to one or more sensed conditions associated with the vehicle 10. Thus, the vehicle 10 can include one or more sensors that can detect and measure observable conditions of the suspension system 20 and/or vehicle 10 and generate sensor signals based on the observable conditions. Accordingly, the dampers 22 can actively respond to road surface conditions in real time based on signals received from the control module 28. In alternative embodiments, the dampers 22 can also respond passively to road conditions.

Figure 2:
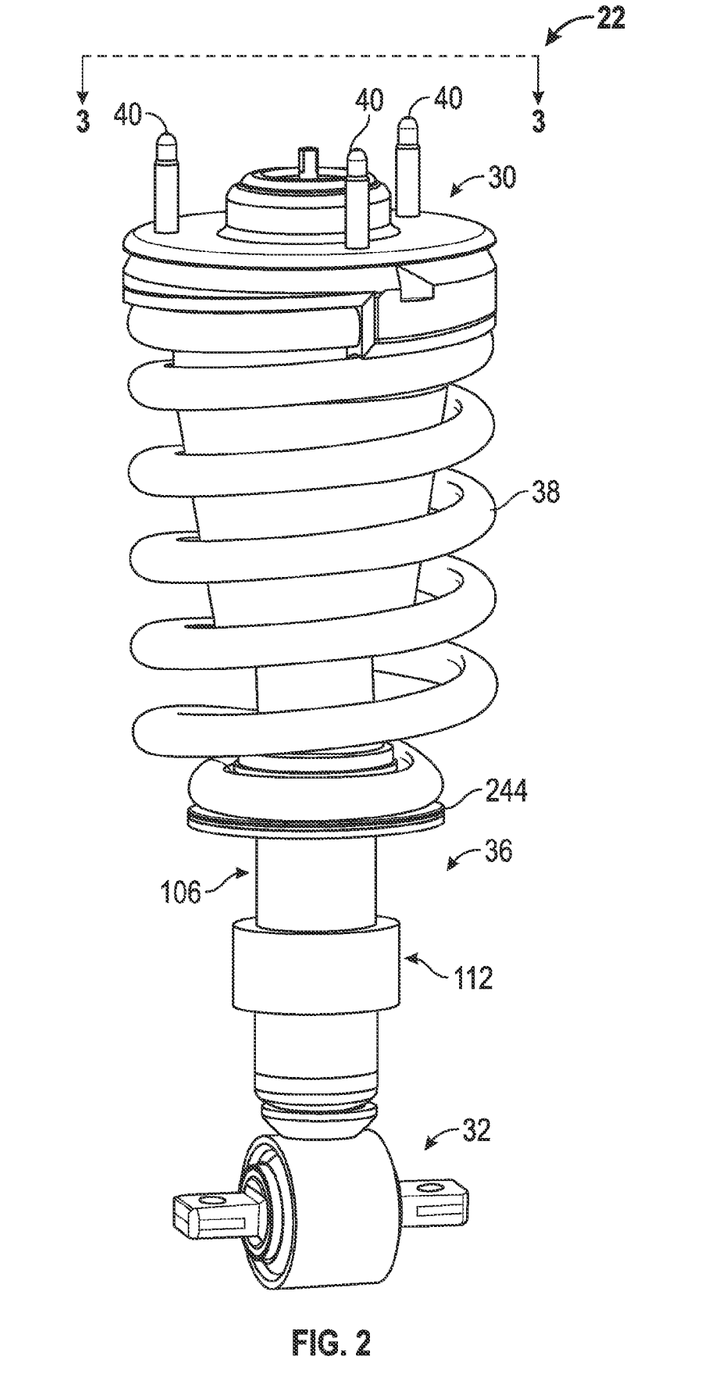
FIG. 2 is a perspective view of the damper of FIG. 1.
Figure 3:
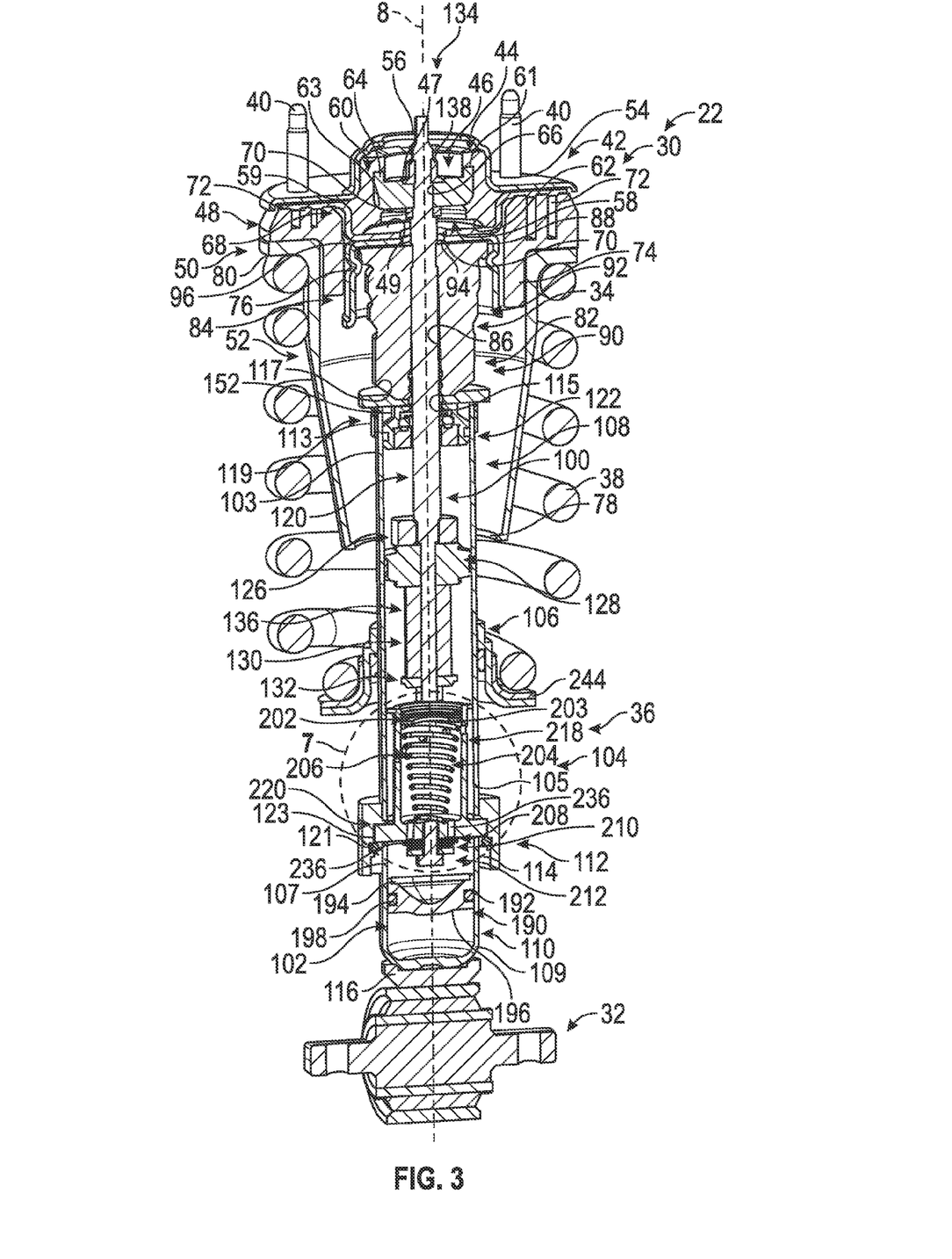
FIG. 3 is a cross-sectional view of the damper of FIG. 2, taken along line 3-3 of FIG. 2, with a first piston system in a first position.

With reference to FIGS. 2 and 3, one of the dampers 22 is shown in greater detail. The damper 22 can include a first or top mounting portion 30, a second or bottom mounting portion 32, a jounce bumper assembly 34 (FIG. 3), a damper tube assembly 36 and a biasing member or spring 38. It should be noted that the components of the damper 22 illustrated and described herein are merely exemplary, as different vehicle applications may require additional components or a modification of the herein described components. Generally, the top mounting portion 30 can be coupled to a portion of the vehicle 10, for example, the vehicle frame 18 using one or more mechanical fasteners 40, as generally known to those skilled in the art. The bottom mounting portion 32 can be coupled to a portion of the vehicle 10, such as a portion of the suspension system 20 using suitable fasteners, including, but not limited to, mechanical fasteners, as known to those skilled in the art.

With reference to FIG. 3, the top mounting portion 30 can include a mounting plate 42, a collar 44, a retaining ring 46, a backing plate 48, an energy absorbing portion 50 and a jacket or dust boot 52. The mounting plate 42 can be substantially annular, and can define one or more apertures 54 for receipt of the mechanical fasteners 40 therethrough. The mounting plate 42 can also define a central counterbore 56, located along a longitudinal axis 8 of the damper 22, which can receive the collar 44, retaining ring 46 and a portion of the damper tube assembly 36. The counterbore 56 can include one or more steps configured to cooperate with an exterior surface of the collar 44, if desired. The collar 44 can be substantially cylindrical, and can include a bore 58 and a flange 59. The flange 59 can be formed about a perimeter or circumference of the collar 44, and can be coupled to or positioned between the mounting plate 42 and the backing plate 48 when the damper 22 is assembled. The bore 58 can extend along the longitudinal axis 8 of the damper 22, and can be substantially coaxial with the counterbore 56 of the mounting plate 42. The bore 58 can include a retaining recess 60 and a relief 62. The relief 62 can enable the collar 44 to move, flex or compress to absorb forces received from the damper tube assembly 36.

The retaining recess 60 can be configured to couple and retain the retaining ring 46 within the bore 58 of the collar 44. In one example, the retaining recess 60 can include a first lip 61 and a second lip 63. The first lip 61 can extend substantially perpendicular to the longitudinal axis 8 of the damper 22 to prevent the retaining ring 46 from moving towards the mounting plate 42, while the second lip 63 can include an arcuate surface to facilitate the coupling of the retaining ring 46 to the collar 44. In one example, the retaining ring 46 can be press fit into the collar 44, however, the retaining ring 46 could be coupled to the collar 44 through any suitable technique, including, but not limited to, welding, adhesives, mechanical fasteners, or can be integrally formed with the collar 44 if desired. Generally, the retaining ring 46, collar 44 and mounting plate 42 can cooperate to distribute energy from a portion of the damper tube assembly 36 to the vehicle frame 18. Thus, at least the collar 44 and the retaining ring 46 can have an increased wall thickness to facilitate the absorption and distribution of forces from the damper tube assembly 36.

The retaining ring 46 can be received within the retaining recess 60 of the collar 44. The retaining ring 46 can be substantially annular, and can be sized to cooperate with the retaining recess 60. In one example, the retaining ring 46 can include a flange 64, which can be configured to be received within the retaining recess 60. The retaining ring 46 can also include a bore 66, which can be defined along the longitudinal axis 8 of the damper 22, and can be substantially coaxial with the counterbore 56 of the mounting plate 42 and the bore 58 of the collar 44 when the damper 22 is assembled. The bore 66 can be sized to receive a portion of the damper tube assembly 36 therethrough to couple a portion of the damper tube assembly 36 to the retaining ring 46, as will be discussed in greater detail herein.

The backing plate 48 can be coupled to the mounting plate 42. The backing plate 48 can include a counterbore 68, which can cooperate with the counterbore 56 of the mounting plate 42 to retain the collar 44 between the mounting plate 42 and backing plate 48. Generally, the flange 59 of the collar 44 can be coupled to or positioned between the counterbore 56 of the mounting plate 42 and the counterbore 68 of the backing plate 48. The counterbore 68 can be defined along the longitudinal axis 8 of the damper 22, and can be substantially coaxial with the counterbore 56 of the mounting plate 42. The counterbore 68 can also include a throughbore 70, which can be sized to receive a portion of the damper tube assembly 36 therethrough. The throughbore 70 can be defined along the longitudinal axis 8, and can be substantially coaxial with at least the bore 66 of the retaining ring 46.

The energy absorbing portion 50 can be coupled to and disposed about a perimeter of the backing plate 48. The energy absorbing portion 50 can assist in the distribution of forces encountered during the operation of the vehicle 10 over road surfaces and can serve as an isolator for the spring 38. In one example, the energy absorbing portion 50 can be substantially asymmetrical with respect to the longitudinal axis 8 to assist in the distribution of cornering forces experienced by the vehicle 10. It should be noted that the energy absorbing portion 50 can have any desired shape, including, but not limited to, being symmetric with respect to the longitudinal axis 8, if desired. The energy absorbing portion 50 can be composed of a suitable energy absorbing material, including, but not limited to a polymeric material, as known to those skilled in the art. The energy absorbing portion 50 can include one or more ribs 72, a flange 74 and a bore 76. The one or more ribs 72 can enhance the stiffness of the energy absorbing portion 50. The flange 74 can extend about a perimeter or circumference of the bore 76, and can prevent contact between the dust boot 52 and the jounce bumper assembly 34. The bore 76 can be defined along the longitudinal axis 8 of the damper 22, and can be sized to enable a portion of the jounce bumper assembly 34 to be coupled adjacent to the flange 74.

The dust boot 52 can be coupled to the energy absorbing portion 50, and in one example, can be coupled to the energy absorbing portion 50 so as to be disposed about the flange 74. The dust boot 52 can cover and protect the jounce bumper assembly 34 from debris encountered during the operation of the vehicle 10. The dust boot 52 can be substantially conical and can be asymmetric with respect to the longitudinal axis 8, however, the dust boot 52 can have any desired shape. The dust boot 52 can define a bore 78 and a first seat 80. The bore 78 can enable the dust boot 52 to substantially surround at least the flange 74, the jounce bumper assembly 34 and a portion of the damper tube assembly 36. The first seat 80 can comprise a spring seat/retainer, which can receive and retain a portion of the spring 38 to assist in coupling the spring 38 about the damper 22.

Figure 9:
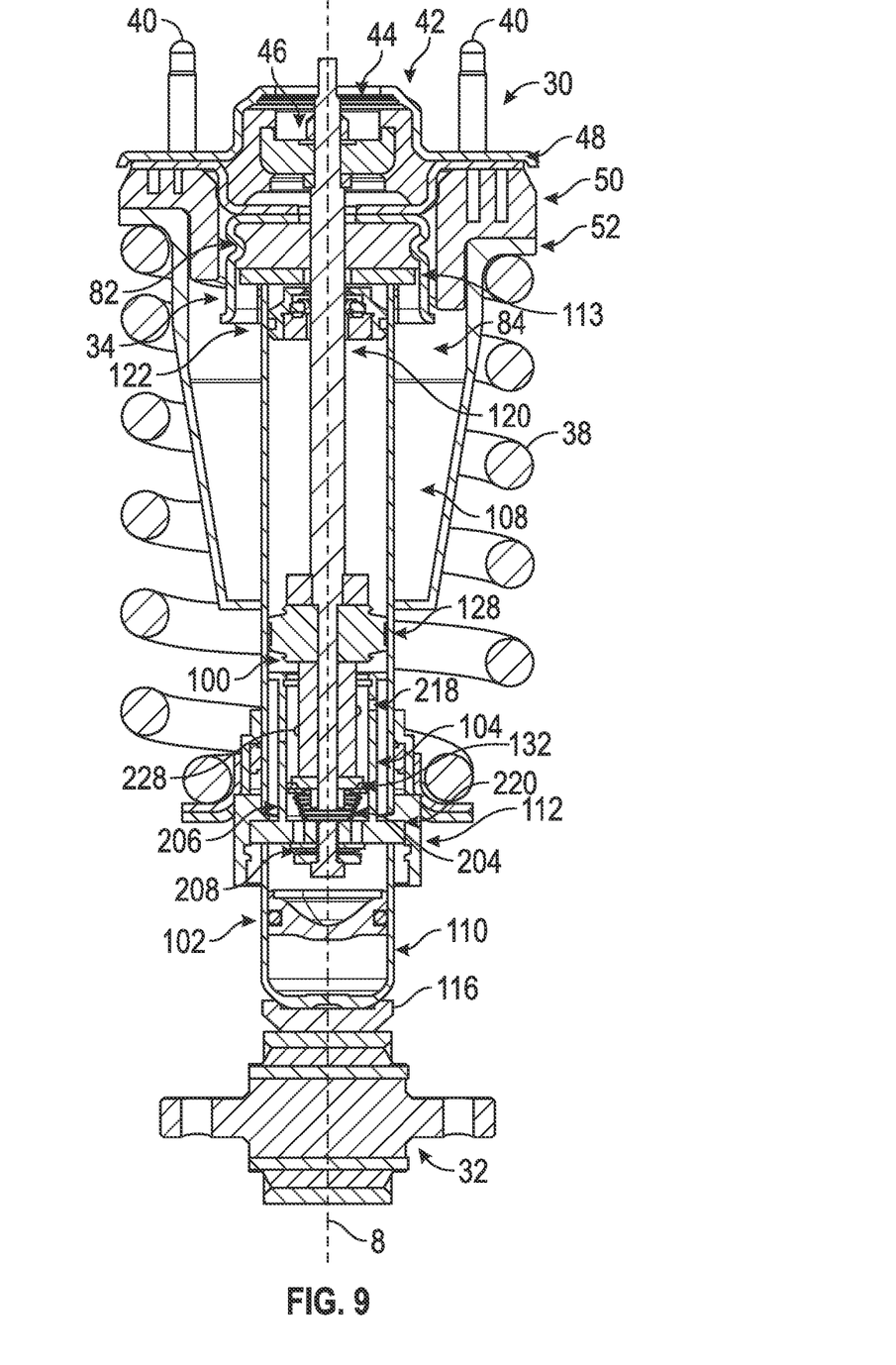
FIG. 9 is a schematic cross-sectional view of the damper of FIG. 2, taken along line 3-3 of FIG. 2, with the first piston system in a second position.

With continued reference to FIG. 3, the jounce bumper assembly 34 can be coupled to the backing plate 48 such that the jounce bumper assembly 34 is positioned between the top mounting portion 30 and the damper tube assembly 36. The jounce bumper assembly 34 can aid in absorbing forces experienced by the vehicle 10 during an impact event. The jounce bumper assembly 34 can include a jounce bumper 82 and a cup 84. The jounce bumper 82 can be retained within the cup 84, and upon impact can expand or deform to substantially fill the cup 84 to absorb energy (FIG. 9). The jounce bumper 82 can be formed of a suitable energy absorbing material, including, but not limited to, a polyurethane foam rubber. With reference to FIG. 3, the jounce bumper 82 can be substantially cylindrical, and can define a bore 86, which can extend from a first end 88 of the jounce bumper 82 to a second end 90 of the jounce bumper 82. The bore 86 can be defined along the longitudinal axis 8, and can receive a portion of the damper tube assembly 36 therethrough. The first end 88 of the jounce bumper 82 can be coupled to the cup 84.

Figure 4:
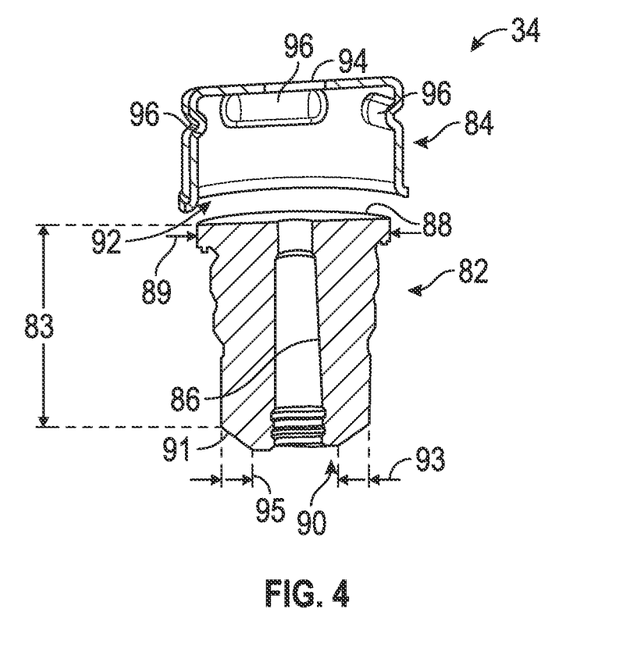
FIG. 4 is a cross-sectional exploded view of a jounce bumper assembly of the damper of FIG. 2, taken along line 3-3 of FIG. 2.

With reference to FIG. 4, the first end 88 can have a diameter 89, which can be larger than a diameter 93 of the second end 90. The second end 90 can also include a tapered surface 91 that tapers to a diameter 95. The diameter 95 can be smaller than the diameter 93 and the diameter 89. The difference in the diameters 93, 95 can provide a smooth transition or lead into the absorption of energy by the jounce bumper 82. In addition, the jounce bumper 82 can have a height 83, which can facilitate the desired amount of energy absorption for the jounce bumper 82. In one example, the height 83 of the jounce bumper 82 can range from about 60 millimeters (mm) to about 90 millimeters (mm). It should be noted, however, that the shape and size of the jounce bumper 82 illustrated and described herein is merely exemplary, and the shape and size of the jounce bumper 82 may vary for different vehicular applications. Generally, the jounce bumper 82 can be compressed by a portion of the damper tube assembly 36 to absorb energy for about 0 millimeters (mm) to about 58 millimeters (mm) of travel of the damper tube assembly 36, as will be discussed in greater detail herein. In one example, the jounce bumper 82 can be configured to absorb about 0 kiloNewton (kN) to about 60 kiloNewton (kN) of force. Thus, it should be understood that the jounce bumper 82 may be optional.

With reference back to FIG. 3, the cup 84 can be substantially cylindrical, and can be coupled to the backing plate 48. The cup 84 can define a cavity 92, which can have a U-shaped cross-section to receive the jounce bumper 82. The cavity 92 can include a throughbore 94, which can be defined along the longitudinal axis 8 of the damper 22 to receive a portion of the damper tube assembly 36 therethrough. With reference to FIG. 4, the cavity 92 can also include one or more protrusions 96. The one or more protrusions 96 can be positioned under the first end 88 of the jounce bumper 82 when the jounce bumper 82 is coupled to the cup 84 to aid in retaining the jounce bumper 82 to the cup 84. Generally, the one or more protrusions 96 can be arranged substantially symmetric about the longitudinal axis 8, however, the one or more protrusions 96 can be arranged asymmetric with respect to the longitudinal axis 8, if desired.

With reference back to FIG. 3, the damper tube assembly 36 can be coupled to the bottom mounting portion 32 and arranged between the bottom mounting portion 32 and the jounce bumper assembly 34. In one example, the damper tube assembly 36 can include a first piston system 100, a second piston system 102 and a jounce shock system 104, which can be substantially contained or housed within a tubular housing 106. In one example, the tubular housing 106 can include a first or top housing portion 108 and a second or bottom housing portion 110. Generally, the top housing portion 108 can include a predetermined amount of a suitable fluid, such as a hydraulic fluid, which can be moved or compressed by the first piston system 100 to absorb and/or dissipate energy during the operation of the vehicle 10. The bottom housing portion 110 can also include a predetermined amount of one or more suitable fluids, including, but not limited to, a hydraulic fluid and a gas. In one example, as will be discussed and as generally known to one skilled in the art, the hydraulic fluid can be contained within the bottom housing portion 110 so as to act on a first face of the second piston system 102 and the gas can be contained within the bottom housing portion 110 so as to act on an opposite face of the second piston system 102. For the ease of illustration the fluids are not illustrated in the drawings.

In this example, the top housing portion 108 can include a coupling 112 and a strike plate 113. The coupling 112 can extend radially outward from a second end 105 of the top housing portion 108 and can include threads 121 that can threadably engage threads 114 formed about a circumference of a first end 107 of the bottom housing portion 110. The coupling 112 can also be sized to fit around a portion of the jounce shock system 104 to assist in retaining the jounce shock system 104 within the tubular housing 106. In addition, the coupling 112 can include an O-ring 123, for example, to aid in coupling the top housing portion 108 to the bottom housing portion 110. The coupling 112 can also provide easy access to the jounce shock system 104. It should be noted that the use of the coupling 112 is merely exemplary, as the tubular housing 106 could have any number of housing portions or could be integrally formed as a single housing portion, if desired.

Furthermore, a portion of the bottom housing portion 110 containing the gas can be disposed in a separate housing in fluid communication with the remainder of the tubular housing 106 to reduce an overall length of the damper 22, as is generally known. The top housing portion 108 can generally enclose at least a portion of the first piston system 100 and jounce shock system 104, while the bottom housing portion 110 can generally enclose the second piston system 102. In one example, a first end 103 of the top housing portion 108 can be disposed adjacent to the jounce bumper assembly 34 when the damper 22 is assembled, and a second end 109 of the bottom housing portion 110 can be coupled to the bottom mounting portion 32. The second end 109 can be coupled to the bottom mounting portion 32 via any suitable technique, including, but not limited to, welding. In one example, a support 116 can be disposed substantially circumferentially about the second end 109 of the bottom housing portion 110 adjacent to the bottom mounting portion 32 to provide additional reinforcement to the tubular housing 106. It should be noted, however, that the support 116 is merely exemplary and need not be included with the damper 22.

The strike plate 113 can be coupled to the first end 103 of the top housing portion 108. In one example, the strike plate 113 can be substantially cup-shaped with a U-shaped cross section, and can include a throughbore 115, a strike surface 117 and a flange 119. The strike plate 113 can be composed of a rigid material, such as a metal or metal alloy, but could be composed of a flexible material, such as a polymer or a polymer coated metal, if desired. The throughbore 115 can enable a portion of the first piston system 100 to pass through the strike plate 113. The strike surface 117 can contact the second end 90 of the jounce bumper 82 during an impact event. The strike surface 117 can be configured to conform to the shape of the second end 90 of the jounce bumper 82, if desired. The flange 119 can assist in coupling and/or retaining the strike plate 113 about a perimeter or circumference of the tubular housing 106. In one example, the strike plate 113 can be press-fit onto the first end 103 of the top housing portion 108, however, the strike plate 113 can be coupled to the tubular housing 106 through any suitable technique, including, but not limited to, crimping, welding, mechanical fasteners, etc.

With reference to FIG. 3, the first piston system 100 can include a rod 120, one or more seals 122, a stop 126, a first piston 128, an extension 130 and a second piston 132. The first piston system 100 can move relative to the top housing portion 108. In one example, the rod 120 can have a first end 134 fixedly coupled or secured to the retaining ring 46 and a second end 136 that is movable within the top housing portion 108. Generally, the first end 134 can be received through the bore 66 of the retaining ring 46 can coupled to a surface 47 of the retaining ring 46 via a suitable mechanical fastener, including, but not limited to, a nut 138. In addition, with reference to FIG. 5, the first end 134 of the rod 120 can include a first shoulder 140. The first shoulder 140 can be sized and shaped to receive a mechanical support, including, but not limited to, a washer 142. The washer 142 can be coupled to the first shoulder 140 of the rod 120 such that the washer 142 is adjacent to another surface 49 of the retaining ring 46, to aid in the distribution of forces along the top mounting portion 30 (FIG. 3).

Figure 5:
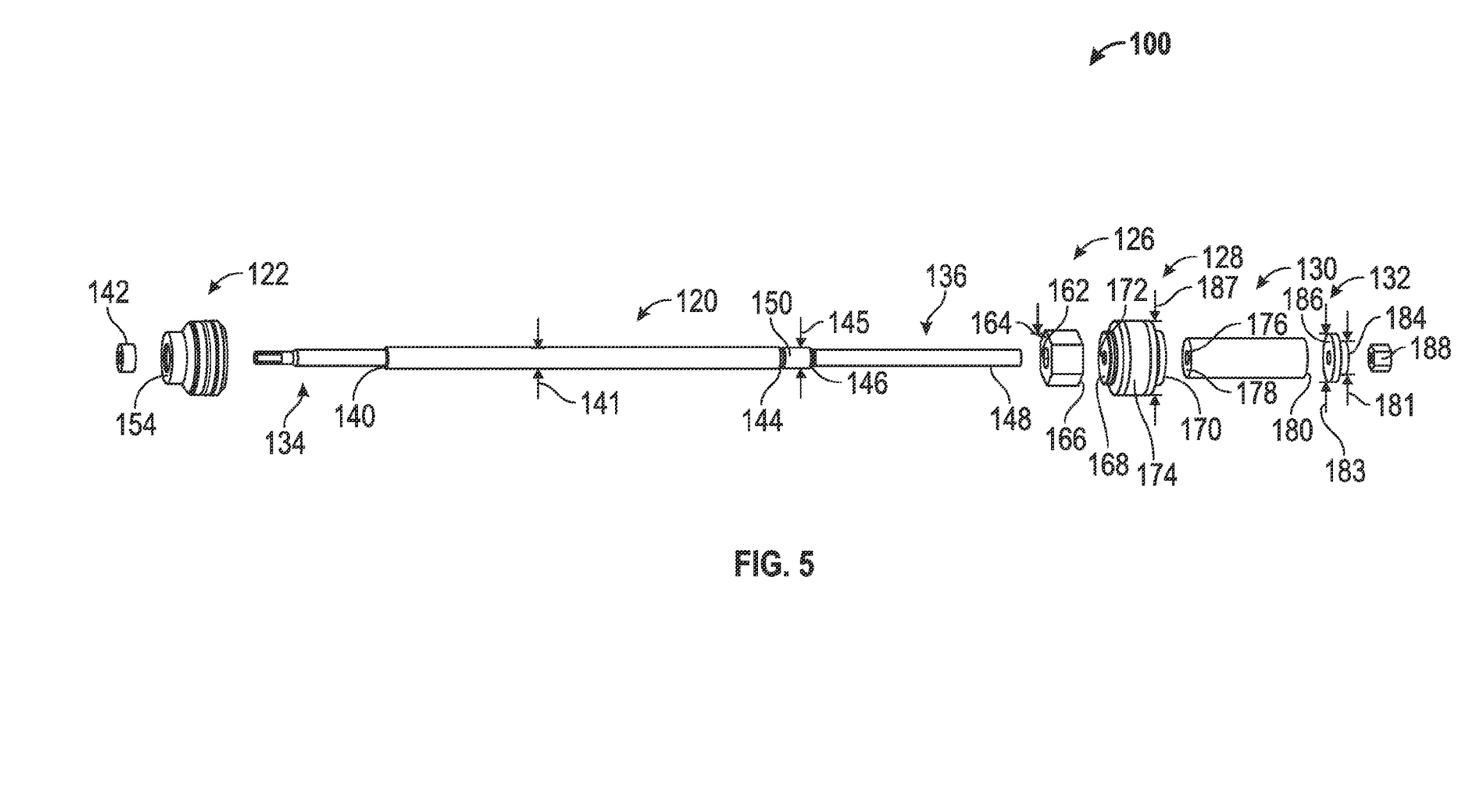
FIG. 5 is an exploded view of the first piston system of the damper of FIG. 2.

With reference to FIG. 5, the second end 136 of the rod 120 can include a second shoulder 144, a third shoulder 146 and a fourth shoulder 148. The rod 120 can have a larger diameter 141 between the first shoulder 140 and second shoulder 144, and a smaller diameter 145 between the second shoulder 144 and third shoulder 146. A receiving surface 150 can be defined between the second shoulder 144 and the third shoulder 146. The receiving surface 150 can receive the stop 126. In one example, the stop 126 can be press-fit onto the receiving surface 150 such that the stop 126 abuts the second shoulder 144, however, the stop 126 can be coupled to the rod 120 via any suitable technique, including, but not limited to, mating threaded engagement. The third shoulder 146 can be adjacent to the first piston 128 when the first piston system 100 is assembled. The second piston 132 can be coupled to the rod 120 so as to rest against the fourth shoulder 148. Thus, the first shoulder 140, second shoulder 144, third shoulder 146 and fourth shoulder 148 can serve as coupling surfaces for various components of the first piston system 100.

With reference to FIG. 3, the one or more seals 122 can be disposed within the top housing portion 108, at or near the first end 103 of the top housing portion 108. Generally, the first end 103 of the top housing portion 108 can include a passageway or bore 152. The bore 152 can be sized to enable the larger diameter 141 of the rod 120 to move through or slidably engage the bore 152. With reference to FIG. 5, the one or more seals 122 can also include a passageway or bore 154, which can be sized to enable the larger diameter 141 of the rod 120 to move through or slidably engage the bore 154. As the one or more seals 122 can be known generally to those skilled in the art, the one or more seals 122 will not be discussed in great detail herein. Briefly, however, in one example, the one or more seals 122 can comprise a plurality of polymeric seals arranged concentrically to define the bore 154, which can cooperate to enable the rod 120 to move relative to the tubular housing 106 without the escape of fluid from the top housing portion 108. Thus, a diameter of the bore 154 can be substantially similar or substantially the same as the diameter 141 of the rod 120. Generally, one or more of the seals 122 can be sized so as to be press-fit into the top housing portion 108, however, the seals 122 could be coupled to the top housing portion 108 via any suitable technique, including, but not limited to, mechanical fasteners or adhesives (FIG. 3).

With reference to FIG. 5, the stop 126 can be substantially annular, and can include a bore 162 defined between a first end 164 and a second end 166. The bore 162 can be sized to enable the stop 126 to be positioned about the rod 120 along the receiving surface 150. The first end 164 of the stop 126 can contact the one or more seals 122 during the movement of the rod 120 relative to the top housing portion 108 to limit or constrain the movement of the rod 120 relative to the top housing portion 108. The second end 166 can be coupled to the first piston 128. It should be noted that along the stop 126 is illustrated herein as being hexagonal, the stop 126 can have any desired shape, including, but not limited to, circular, octagonal, etc.

The first piston 128 can include a first face 168, a second face 170 and a bore 172, which can extend from the first face 168 to the second face 170 to enable the first piston 128 to be positioned about the second end 136 of the rod 120. In one example, the first piston 128 can be substantially annular, and can have a diameter. The diameter of the first piston 128 can be substantially similar to the diameter of the top housing portion 108 to reduce or prevent the flow of fluid about the first piston 128. Generally, the first face 168 of the first piston 128 can be coupled or positioned adjacent to the stop 126, while the second face 170 can be coupled or positioned adjacent to the extension 130. The second face 170 can also be in contact with or exposed to the hydraulic fluid contained within the top housing portion 108 such that movement of the rod 120 within the tubular housing 106 can cause the first piston 128 to compress or expand the hydraulic fluid contained within the tubular housing 106.

The first piston 128 can also include a wear surface 174, which can be positioned about a perimeter or circumference of the first piston 128 between the first face 168 and second face 170. In one example, the wear surface 174 can be composed of a material that is different than a material of the first piston 128. For example, the wear surface 174 can be composed of a TEFLON® coated metal alloy, while the first piston 128 can be composed of a metal alloy. TEFLON® is commercially available from E. I. du Pont de Nemours and Company of Wilmington, Del. Generally, the wear surface 174 is configured to enable the first piston 128 to move within the top housing portion 108 with reduced friction, which can increase the life of the first piston 128.

The extension 130 can be coupled about a perimeter or circumference of the rod 120 at the second end 136. The extension 130 can be substantially cylindrical, and can include a throughbore 176 defined from a first end 178 to a second end 180. The throughbore 176 can have a diameter sized to enable the extension 130 to be disposed about the rod 120. The first end 178 can be coupled to the second face 170 of the first piston 128, and the second end 180 can be coupled to the second piston 132. Generally, the extension 130 can reinforce the second piston 132 and can provide a larger surface area for the distribution of forces encountered by the second piston 132. Accordingly, the extension 130 can generally be composed of a metal or a metal alloy, however, any suitable material could be employed.

The second piston 132 can be coupled to the extension 130 and disposed about a perimeter or circumference of the rod 120. Generally, the second piston 132 can be composed of a suitable metal or metal alloy, however, the second piston 132 could be composed of any suitable material, including, but not limited to a polymer. The second piston 132 can be substantially annular, however, the second piston 132 can have any desired shape. The second piston 132 can include a first face 182, a second face 184 and a bore 186, which can extend from the first face 182 to the second face 184. The first face 182 can be coupled to the extension 130. The second face 184 can be coupled to a mechanical fastener, including, but not limited to a nut 188, which can couple at least the second piston 132 to the rod 120. Generally, the bore 186 can enable the second piston 132 to be positioned about the rod 120 such that the second piston 132 is adjacent to the fourth shoulder 148 to aid in coupling the second piston 132 to the rod 120 via the nut 188. The second face 184 can have a diameter 181, which can be smaller than a diameter 183 of the first face 182 to aid in the movement of the second piston 132 within the tubular housing 106, however, the second piston 132 can have any desired shape. In addition, the second piston 132 can generally be sized such that the diameter 183 is smaller than a diameter 187 of the first piston 128. The size of the second piston 132 can enable the second piston 132 to engage the jounce shock system 104, as will be discussed herein.

With reference to FIG. 3, the second piston system 102 can be positioned within the bottom housing portion 110 adjacent to the jounce shock system 104. In one example, the second piston system 102 can comprise a floating piston system, such that the second piston system 102 need not include a rod. Generally, the second piston system 102 can move or slide within the tubular housing 106 based on forces generated by the compression or expansion of the hydraulic fluid in the tubular housing 106, as generally known to those skilled in the art. In this example, the second piston system 102 can include a third piston 190 and a wear surface 192. The third piston 190 can be substantially cylindrical, and can have a substantially U-shaped cross-section along the longitudinal axis 8 of the damper 22. The third piston 190 can include a first face 194, a second face 196 and can define a groove 198.

The first face 194 can be positioned adjacent to the jounce shock system 104 and can be in contact with or exposed to the hydraulic fluid, and the second face 196 can be in contact with or exposed to the gas. The first face 194 can be substantially concave, however, the first face 194 can have any desired shape. The groove 198 can be defined about a perimeter or circumference of an exterior surface of the third piston 190. The wear surface 192 can be coupled to or received in the groove 198. The wear surface 192 can enable the third piston 190 to repeatedly move or slide within the tubular housing 106, and can be formed of a material with a reduced coefficient of friction, similar to the wear surface 174 of the first piston 128. Generally, at least the wear surface 192 can have a diameter, which can be substantially similar to or substantially the same as the inner diameter of the tubular housing 106 to prevent the flow of hydraulic fluid and/or gas beyond the third piston 190 during the movement of the second piston system 102 within the tubular housing 106. It should be noted that the configuration of the second piston system 102 is merely exemplary.

Figure 6:
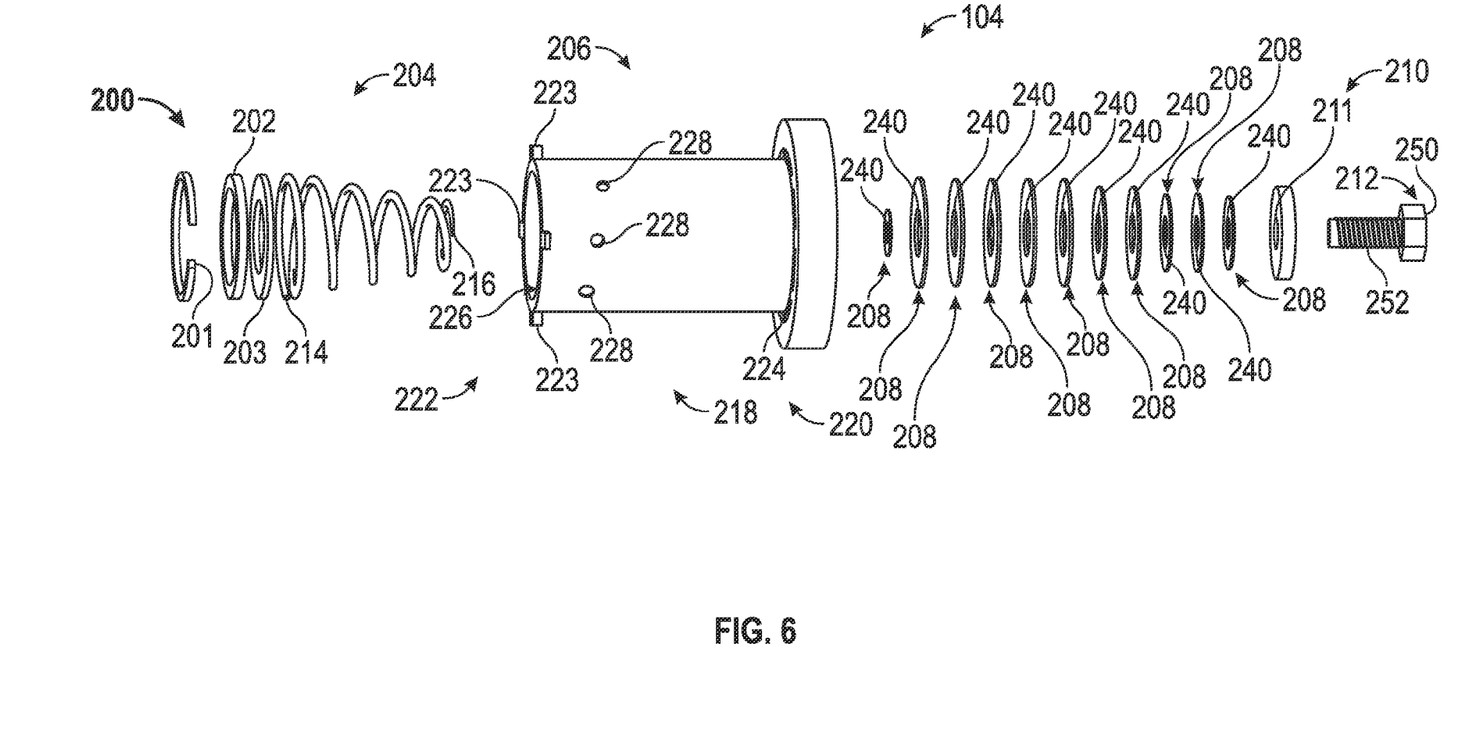
FIG. 6 is an exploded view of a jounce shock system of the damper of FIG. 2.

With reference to FIGS. 3 and 6, the jounce shock system 104 can be positioned substantially within the tubular housing 106. The jounce shock system 104 can include a first ring 200, a second ring 202, a third ring 203, a biasing member 204, a flask 206, one or more discs 208, a mechanical coupling system, including, but not limited to a washer 210 and a bolt 212. The jounce shock system 104 can cooperate with the second piston 132 to further absorb or dissipate energy generated during an impact event. In one example, the jounce shock system 104 can absorb or dissipate energy from about 20 millimeters (mm) to about 25 millimeters (mm) of travel of the rod 120 towards the bottom mounting portion 32. As a further example, the jounce shock system 104 can absorb or dissipate about 10 kiloNewton (kN) to about 28 kiloNewton (kN) of force. Generally, the jounce shock system 104 can be positioned within the tubular housing 106 such that the first ring 200, second ring 202, biasing member 204 and the flask 206 are substantially disposed in the top housing portion 108, and the one or more discs 208, washer 210 and the bolt 212 are disposed substantially in the bottom housing portion 110. In this example, a portion of the flask 206 can be received in the coupling 112 to aid in coupling the flask 206 to the tubular housing 106. The jounce shock system 104 can be disposed in and surrounded by the hydraulic fluid contained within the tubular housing 106.

With reference to FIG. 6, the first ring 200 can comprise a snap ring, which can retain the second ring 202, the third ring 203 and the biasing member 204 within the flask 206. In one example, the first ring 200 can include an opening 201 along a perimeter or circumference of the first ring 200 to enable placement of the first ring 200 within the flask 206. Generally, the first ring 200 can have a diameter larger than at least a portion of a diameter of the flask 206 to enable the first ring 200 to snap or lock into place upon insertion into the flask 206.

The second ring 202 can comprise a sintered ring, which can be positioned between the first ring 200 and the third ring 203 when the jounce shock system 104 is assembled. The second ring 202 can act as a wear surface when the second piston 132 is displaced into the jounce shock system 104. In this regard, when the second face 184 of the second piston 132 enters the jounce shock system 104, the difference in diameters between the first face 182 and second face 184 of the second piston 132 can cause the second ring 202 to be coupled about the second face 184 of the second piston 132 (FIG. 9). The coupling or engagement of the second ring 202 to the second piston 132 can create a seal between the second face 184 of the second piston 132 and the flask 206, which can prevent the flow of hydraulic fluid past the second face 184 of the second piston 132. Thus, the second ring 202 can have a diameter, which can be substantially greater than the diameter 181 of the second face 184 of the second piston 132, but substantially smaller than the diameter 183 of the first face 182 of the second piston 132 (FIG. 5). The second ring 202 can generally be composed of a metal or metal alloy, but can also be composed of a low or reduced friction metal or metal alloy, similar to the wear surface 174 of the first piston 128. The second ring 202 can also be formed with a small gap in the circumference of the second ring 202, if desired, to further facilitate the coupling of the second ring 202 to the second piston 132.

Figure 7:
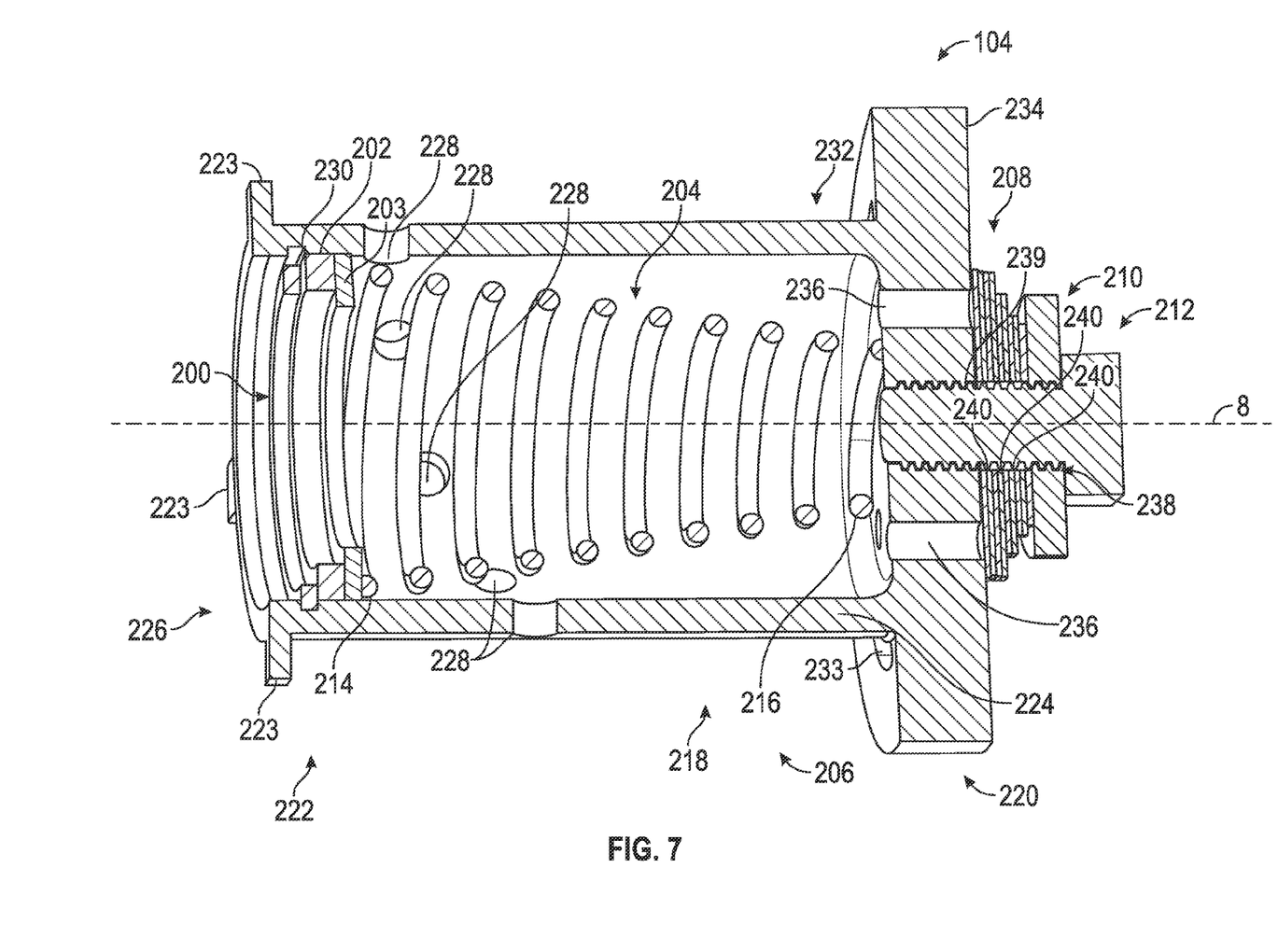
FIG. 7 is a detail cross-sectional view of the jounce shock system taken from FIG. 3.

With reference to FIGS. 6 and 7, the third ring 203 can be positioned between the second ring 202 and the biasing member 204 when the jounce shock system 104 is assembled. The third ring 203 can comprise a seat for the biasing member 204. It should be noted that the third ring 203 is merely exemplary, as the biasing member 204 could seat or bear against the second ring 202, if desired. The third ring 203 can have a diameter sized so that the second piston 132 can move the third ring 203 upon advancement of the second piston 132 within the flask 206. Thus, the second piston 132 can move within the flask 206 against a force of the biasing member 204 (FIG. 9).

Referring to FIGS. 6 and 7, the biasing member 204 can be received within the flask 206, and can comprise a coil spring. The biasing member 204 can be substantially conical in shape, and can have an external circumference that can taper from a first end 214 to a second end 216. Generally, the biasing member 204 can be assembled in the flask 206 in a partially compressed state to aid in compressing the third ring 203 against the second ring 202 and first ring 200. This can also prevent unwanted noise in the jounce shock system 104. The first end 214 of the biasing member 204 can bias against the third ring 203, while the second end 216 can bias against a portion of the flask 206.

With reference to FIGS. 6 and 7, the flask 206 can enclose the first ring 200, second ring 202, third ring 203 and biasing member 204. The flask 206 can include a projection 218 that can extend outwardly from a base 220. The projection 218 can be substantially cylindrical, and can include a first end 222, a second end 224, a passageway 226, which can extend from the first end 222 to the second end 224, and at least one tuning bore 228. The first end 222 can include one or more flanges 223, which can assist in orientating the flask 206 within the tubular housing 106 (FIG. 3). The second end 224 can be coupled to the base 220. With reference to FIG. 7, the passageway 226 can be sized to receive the first ring 200, second ring 202, third ring 203, biasing member 204, the second piston 132 and nut 188. The passageway 226 can also include a groove 230, which can be sized to cooperate with the first ring 200 to retain the first ring 200, second ring 202, third ring 203 and biasing member 204 within the flask 206.

The at least one tuning bore 228 can be defined through the projection 218 between the first end 222 and the second end 224. In one example, the at least one tuning bore 228 can comprise at least three substantially circular tuning bores 228 defined in an accurate pattern along the projection 218 near the first end 222. It should be noted that this configuration of tuning bores 228 is merely exemplary, as the flask 206 can also include at least five substantially circular tuning bores 228, or any number of tuning bores 228, including, but not limited to seven tuning bores 228. Generally, the at least one tuning bore 228 can enable the release of hydraulic fluid from the flask 206 to reduce the force or pressure experienced by the second piston 132 as the second piston 132 advances from the first end 222 of the flask 206 to the second end 224. Thus, the at least one tuning bore 228 can provide for a gradual rise in force or entry force experienced by the second piston 132, which can make the engagement of the jounce shock system 104 less noticeable to an operator of the vehicle 10. Given the different damping force requirements for different vehicle applications, the at least one tuning bore 228 and the configuration of the at least one tuning bore 228, including quantity and location, can generally vary for each vehicular application. Accordingly, the configuration of one or more tuning bores 228 can enable the manufacturer of the vehicle 10 to customize the entry force experienced by the second piston 132 and optimize the dissipation of forces experienced during an impact event.

In one example, the number of tuning bores 228 can be determined based on a desired entry force for the second piston 132 into the flask 206. In this example, the following equations can be used to determine the flow rate through the one or more tuning bores 228:

$$Q = Q_1 + Q_2 \tag{1}$$

$$Q_1 = cd * C_{AP} * p^{3/2} * \left(\frac{2}{\rho}\right)^{1/2} \tag{2}$$

$$Q_2 = cd * A_o * p^{1/2} * \left(\frac{2}{\rho}\right)^{1/2} \tag{3}$$

Where Q is the overall volumetric flow rate through the flask 206, $Q_1$ is the flow rate through at least one first fluid passageway 236 of the base 220 of the flask 206, $Q_2$ is the volumetric flow rate through the at least one tuning bore 228, cd is the hydraulic fluid discharge coefficient, p is the pressure drop or desired entry force in Newton per millimeter squared (N/mm²), ρ is the density in grams per cubic millimeter (g/mm³), $C_{AP}$ is the compliance coefficient for the at least one first fluid passageway 236 of the base 220 in millimeters to the fourth power per Newton (mm⁴/N) and $A_o$ is the area of the at least one tuning bore 228 in millimeters squared (mm²). In one example, it can be assumed that area of the at least one first fluid passageway 236 of the base 220 is proportional to pressure and that the pressure is proportional to flow rate to the ⅔ power. Given the determined flow rate, the number of tuning bores 228 can be selected to arrive at the determined flow rate for the desired entry force.

With continued reference to FIG. 7, the base 220 can be coupled to the second end 224 of the projection 218. The base 220 can include a first surface 232 opposite a second surface 234, at least one first fluid passageway 236, at least one second fluid passageway 237 and a coupling bore 238. The first surface 232 can be coupled to the projection 218 and in contact with the second end 216 of the biasing member 204. The first surface 232 can include a relief 233, which can aid in the manufacture of the flask 206. The second surface 234 can be coupled to the one or more discs 208. The at least one first fluid passageway 236 can enable fluid, such as the hydraulic fluid, to flow through the flask 206 upon the advancement of the second piston 132 into the flask 206. Thus, the quantity and size of the at least one first fluid passageway 236 can cooperate with the one or more discs 208 to also tune the amount of force dissipated by the jounce shock system 104. In one example, with reference to FIG. 8, the at least one first fluid passageway 236 can include about 8 first fluid passageways 236 which can be defined through the base 220. Generally, the one or more first fluid passageways 236 can each be defined along axes that are parallel to the longitudinal axis 8. The at least one second fluid passageway 237 can be defined through the first surface 232 and second surface 234, and can be spaced apart a perimeter or circumference of the base 220. The at least one second fluid passageway 237 can enable fluid, such as the hydraulic fluid, to flow through the base 220 of the flask 206 upon the advancement of the first piston 128 within the top housing portion 108. With reference back to FIG. 7, the at least one coupling bore 238 can be defined along the longitudinal axis 8, and can include a plurality of threads 239 to couple the bolt 212 to the flask 206.

Figure 8:
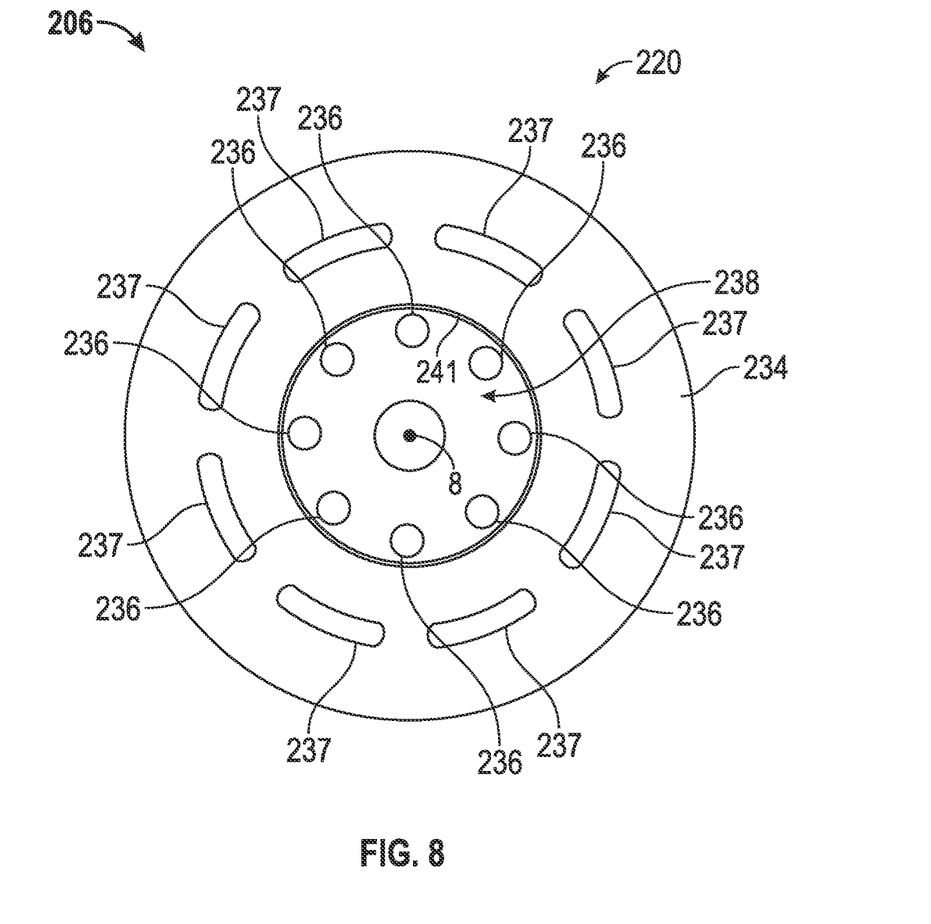
FIG. 8 is an end view of a flask of the jounce shock system of FIG. 6.

The one or more discs 208 can be coupled to the second surface 234 of the base 220, and can be at least partially received within a recess 241 defined in the second surface 234 of the base 220 (FIG. 8). With regard to FIG. 7, each of the one or more discs 208 can include a bore 240, through which the bolt 212 can pass to couple the one or more discs 208 to the flask 206. Generally, the one or more discs 208 can be coupled to the base 220 to at least partially obscure or substantially cover the at least one first fluid passageway 236. The one or more discs 208 can be composed of a flexible material so that upon the advancement of the second piston 132 through the projection 218, the hydraulic fluid can cause the one or more discs 208 to deflect and permit the escape of hydraulic fluid from the flask 206. In one example, the one or more discs 208 can be composed of a polymeric material, however, any suitable material could be employed. With reference to FIG. 6, in one example, the one or more discs 208 can comprise, but is not limited to, about 11 discs 208, which can cooperate to deflect upon the application of a predetermined pressure from the compression of the hydraulic fluid. It should be noted that each of the discs 208 can have a thickness, which can vary for each of the discs 208 or could be substantially similar amongst two or more of the discs 208. In addition, the discs 208 can be each composed of the same material, or could be composed of a different material. The one or more discs 208 can also cooperate with the at least one first fluid passageway 236 to enable the customization of a magnitude of a force that can be dissipated by the jounce shock system 104. Thus, any number of discs 208 can be coupled to the flask 206 to dissipate a force of desired magnitude. In this example, the discs 208 can dissipate a force with a magnitude of about 28 kiloNewton (kN).

With continued reference to FIG. 6, the washer 210 can be used to assist in coupling the one or more discs 208 to the flask 206 with the bolt 212. The washer 210 can include a bore 211, through which the bolt 212 can pass. The bolt 212 can include a head 250 and a shank having a plurality of threads 252, which can engage the plurality of threads 239 of the coupling bore 238.

With regard to FIG. 3, the spring 38 can comprise a coil spring, which can be disposed about the dust boot 52 and the top housing portion 108 of the tubular housing 106. Generally, the spring 38 can be disposed substantially circumferentially about the dust boot 52 and top housing portion 108, and can extend along the longitudinal axis 8 of the damper 22. The spring 38 can bias against the first seat 80 defined by the dust boot 52, and a second seat 244 coupled to the top housing portion 108. The spring 38 can restore the damper 22 to an equilibrium height after an impact event.

Generally, in order to assemble the damper 22, in one example with reference to FIGS. 3-7, the first piston system 100 can be assembled to the rod 120, and the at least one seal 122 can be disposed in the top housing portion 108. The rod 120 can be inserted into the top housing portion 108 such that the first end 134 extends beyond the first end 103 of the top housing portion 108. Then, the second piston system 102 can be disposed in the bottom housing portion 110 of the tubular housing 106. The jounce shock system 104 can be assembled, with the biasing member 204 partially compressed against the first ring 200, second ring 202 and third ring 203 (FIG. 7). The first ring 200 can be used to secure the biasing member 204, second ring 202 and third ring 203 within the projection 218. The one or more discs 208 can also be coupled to the flask 206 via the bolt 212 and washer 210. With the jounce shock system 104 assembled, the jounce shock system 104 can be inserted into the top housing portion 108 such that the base 220 of the flask 206 can be partially received within the coupling 112 (FIG. 3). Then, the hydraulic fluid can be introduced into the top housing portion 108 and bottom housing portion 110. The coupling 112 can be rotated or tightened to couple the top housing portion 108 to the bottom housing portion 110. Then, with the top mounting portion 30 assembled and the strike plate 113 and second seat 244 coupled to the tubular housing 106, the jounce bumper system 34 can be coupled to the top mounting portion 30 and the spring 38 can be inserted between the dust boot 52 and the second seat 244. Then, the first end 134 of the rod 120 can be coupled to the retaining ring 46 via the nut 138.

In the event of an impact, with reference to FIG. 9, the first piston 128 and second piston 132 can be moved or advanced by the rod 120 from a first position near the top housing portion 108 towards the bottom housing portion 110, thereby pressurizing the hydraulic fluid to dissipate energy. During the movement of the first piston 128 and second piston 132, the strike plate 113 can contact the jounce bumper 82. Generally, the jounce bumper 82 can be contacted after about 8 millimeters (mm) of travel of the rod 120 within the tubular housing 106. The continued application of force from the impact event can cause the continued movement or advancement of the rod 120 towards a second position within the tubular housing 106 and can substantially simultaneously cause the gradual deflection or compression of the jounce bumper 82. Once the jounce bumper 82 has undergone some deflection, such that the jounce bumper 82 has conformed to the cup 84, the rod 120 can be advanced within the tubular housing 106 such that the second piston 132 is adjacent to the jounce shock system 104. Generally, the jounce bumper 82 can be compressed after about 15 millimeters (mm) of travel of the rod 120 within the tubular housing 106, and with the continued travel of the rod 120 to about 25 millimeters (mm) of travel within the tubular housing 106, the rod 120 can be advanced such that the second piston 132 engages the second ring 202.

Additional travel of the rod 120 within the tubular housing 106 can cause the compression of the biasing member 204 and the pressurization of the hydraulic fluid within the flask 206. The at least one tuning bore 228 can cause a smooth entry transition for the second piston 132 into the flask 206. The increased pressure of the hydraulic fluid can cause the deflection of the one or more discs 208 to enable fluid to pass through the one or more first fluid passageways 236 of the flask 206. Generally, the rod 120 can travel within the projection 218 of the flask 206 to compress the biasing member 204 and pressurize the hydraulic fluid for about another 10 millimeters (mm) until the rod 120 reaches a maximum amount of travel or the second position, as indicated in FIG. 9. Thus, the jounce shock system 104 can be activated during the last about 25 millimeters (mm) to about 35 millimeters (mm) of travel of the rod 120. It should be noted that the travel distances described herein are merely exemplary, as the rod 120 and the travel of the rod 120 can be sized to correspond to the particular vehicular application.

The jounce bumper 82 in combination with the jounce shock system 104 can reduce the amount of forces experienced by the vehicle frame 18, which can enable a reduction in mass of the vehicle frame 18. The reduction in mass of the vehicle frame 18 can lead to increased fuel economy. In addition, the use of the jounce bumper 82 in combination with the jounce shock system 104 can enable the use of lower profile tires and larger wheels, as the damper 22 including the jounce bumper 82 and the jounce shock system 104 can absorb larger forces without requiring a larger sized damper 22. Further, the use of the jounce bumper 82 in combination with the jounce shock system 104 can improve off-road handling and performance of the vehicle 10, and thus, can improve operator satisfaction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A damper, comprising:
a top mounting portion adapted to couple the damper to a vehicular frame;
a bottom mounting portion adapted to couple the damper to a vehicular suspension system; and
a damper tube assembly disposed between the top mounting portion and the bottom mounting portion, the damper tube assembly including a jounce shock system and a rod having a first piston and a second piston, the second piston having a first face coupled to the rod and a second face, the rod movable within the damper tube assembly from a first position to a second position, the second piston engages the jounce shock system as the rod approaches the second position and the damper tube assembly further comprises a tubular housing having a first housing portion adjacent to the top mounting portion and a second housing portion coupled to the bottom mounting portion, the damper tube assembly further comprising a third floating piston disposed in the second housing portion,
wherein the jounce shock system further comprises:
a flask received in the tubular housing having a projection that extends from a base, the projection having a first projection end and a second projection end opposite the first projection end, the projection defining a passageway that extends from the first projection end to the second projection end; and
at least one ring sized to be coupled to the second face of the second piston, the at least one ring received within the passageway adjacent to the first projection end,
wherein as the rod approaches the second position, the second piston engages the at least one ring to move the at least one ring from the first projection end towards the second projection end.

2. The damper of Claim 1, wherein the damper further comprises a jounce bumper assembly coupled to the top mounting portion between the top mounting portion and the damper tube assembly, the jounce bumper assembly including a jounce bumper, and the rod passes through the jounce bumper.

3. The damper of Claim 1, wherein the rod has a first rod end coupled to the top mounting portion and a second rod end, and the first piston is coupled to the second rod end.

4. The damper of claim 3, wherein the rod further comprises an extension having a first end opposite a second end, the first end coupled to the second rod end adjacent to the first piston and the second piston is coupled to the second end.

5. The damper of Claim 1, wherein the first piston has a first diameter, and the second piston has a second diameter, and the first diameter is different than the second diameter.

6. The damper of claim 4, wherein the first face is coupled to the second end, the first face of the second piston has a first face diameter and the second face has a second face diameter, the first face diameter different than the second face diameter.

7. The damper of claim 1, wherein the jounce shock system further comprises:
a spring seat ring disposed adjacent to the at least one ring; and
a biasing member coupled to the spring seat ring and positioned in the passageway between the spring seat ring and the second projection end,
wherein movement of the at least one ring moves the spring seat ring to compress the biasing member.

8. The damper of claim 1, wherein the flask includes at least one tuning bore defined through a sidewall of the projection between the first projection end and the second projection end.

9. The damper of claim 1, wherein the base of the flask includes at least one fluid passageway defined through the base of the flask and in communication with the passageway of the projection.

10. The damper of claim 9, wherein the base includes a first base end opposite a second base end, the first base end adjacent to the passageway of the projection and the second base end adjacent to the third floating piston, the second base end including at least one disc coupled to the second base end that at least partially obscures the at least one fluid passageway defined through the base of the flask.

11. A vehicle, comprising:
a frame;
a suspension system having a damper, the damper including:
a top mounting portion coupled the frame;
a bottom mounting portion coupled to the suspension system;
a jounce bumper assembly including a jounce bumper coupled to the top mounting portion, the jounce bumper defining a bore;
a rod coupled to the top mounting portion at a first rod end and passing through the bore of the jounce bumper, the rod including a first piston spaced apart from a second piston at a second rod end;
a tubular housing disposed between the top mounting portion and coupled to the bottom mounting portion, the rod movable within the tubular housing from a first position to a second position; and
a jounce shock system disposed within the tubular housing, the jounce shock system including a flask defining a passageway,
wherein the second piston enters the passageway of the flask when the rod approaches the second position and the flask includes a plurality of tuning bores defined through a sidewall of the projection between the first projection end and the second projection end so as to be spaced about a circumference of the projection; and wherein the flask further comprises a projection that defines the passageway and a base, the projection having a first projection end and a second projection end opposite the first projection end, with the passageway extending from the first projection end to the second projection end.

12. The vehicle of claim 11, wherein the rod further comprises an extension having a first end opposite a second end, the first end coupled to the second rod end between the first piston and the second piston.

13. The vehicle of claim 11, wherein the jounce shock system further comprises:
   at least one ring for coupling to a face of the second piston when the rod approaches the second position, the at least one ring received within the passageway adjacent to the first projection end,
   wherein as the rod approaches the second position, the second piston engages the at least one ring to move the at least one ring from the first projection end towards the second projection end.

14. The vehicle of claim 13, wherein the jounce shock system further comprises:
   a spring seat ring disposed adjacent to the at least one ring; and
   a biasing member coupled to the spring seat ring and positioned in the passageway between the spring seat ring and the second projection end,
   wherein movement of the at least one ring moves the spring seat ring to compress the biasing member.

15. The vehicle of claim 11, wherein the base of the flask includes at least one fluid passageway defined through the base of the flask and in communication with the passageway of the projection.

16. The vehicle of claim 15, wherein the base includes a first base end opposite a second base end, the first base end adjacent to the passageway of the projection and the second base end including at least one disc coupled to the second base end that at least partially obscures the at least one fluid passageway defined through the base of the flask.

* * * * *